July 5, 1927.

L. C. COLE 1,634,396

COUNTERBALANCE FOR LATHES

Filed Aug. 13, 1925

INVENTOR
L.C.Cole
BY
Joseph M. Schofield
ATTORNEY

July 5, 1927.
L. C. COLE
1,634,396
COUNTERBALANCE FOR LATHES
Filed Aug. 13, 1925
3 Sheets-Sheet 2
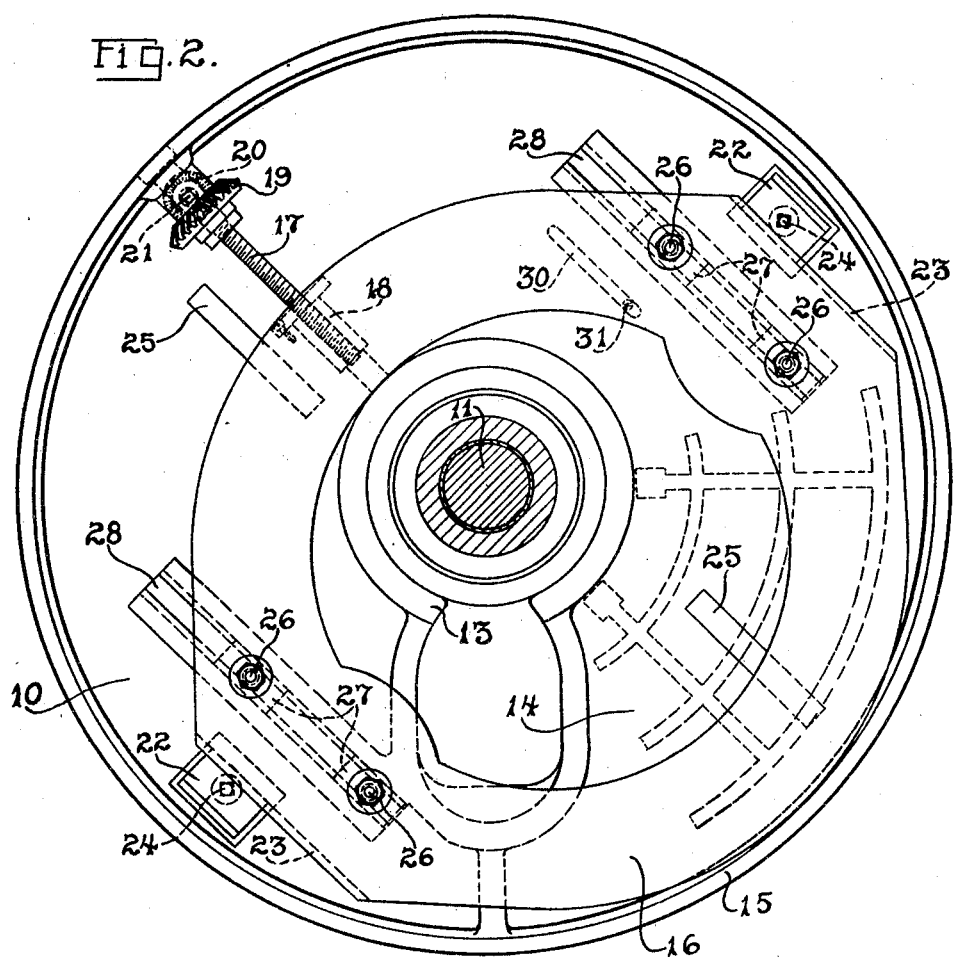
INVENTOR
L. C. Cole
BY
Joseph H. Schofield
ATTORNEY July 5, 1927.
L. C. COLE
1,634,396
COUNTERBALANCE FOR LATHES
Filed Aug. 13, 1925  3 Sheets-Sheet 3
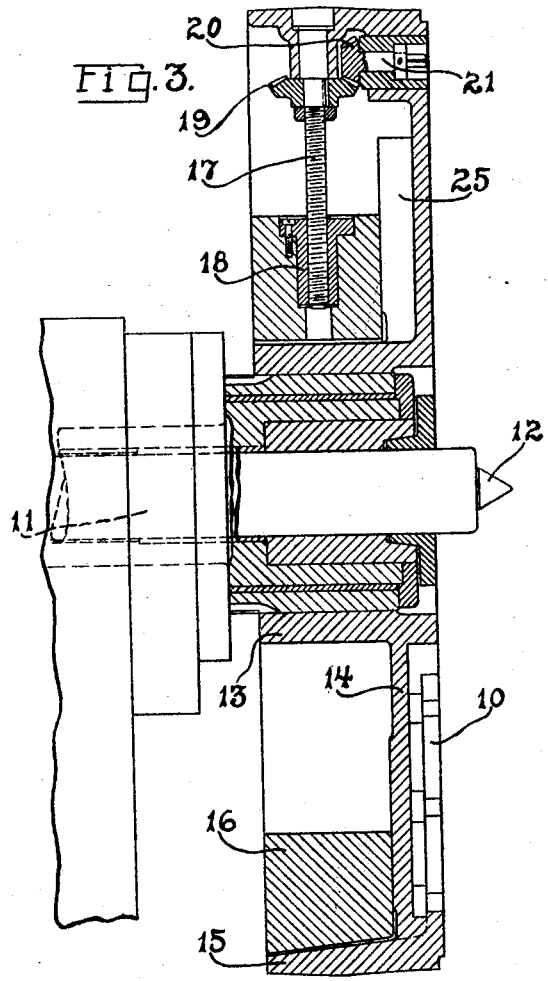
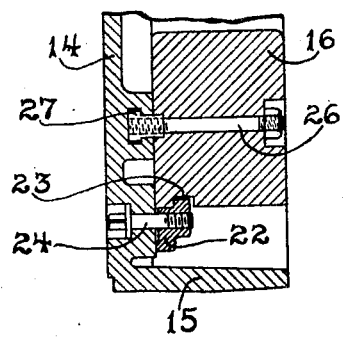
INVENTOR
L. C. Cole
BY
Joseph H. Schofield
ATTORNEY Patented July 5, 1927.

1,634,396

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

COUNTERBALANCE FOR LATHES.

Application filed August 13, 1925. Serial No. 50,064.

This invention relates to counterweights for face plates of lathes of large size to effect counterbalancing. More particularly the invention relates to an adjustable form of counterweight adapted to be positioned upon the face plate of a car wheel journal turning lathe and adapted to be adjusted for varying its counterbalancing effect.

It is an object of the invention to provide an improved form of counterweight which can be conveniently mounted upon a face plate of a lathe and adjusted to different positions so that the counterbalancing effect may be entirely neutralized or varied to a maximum.

It is another object of the invention to provide a counterweight of annular form surrounding the headstock spindle of the lathe and adjustably mounted on the rear face of the face plate so that the counterweight can be moved to a position with its center of gravity in alinement with the axis of rotation of the face plate so that the counterbalancing effect will be entirely neutralized or to eccentric positions having varying counterbalancing effects.

A further object of importance is that means are provided operable from the front face of the face plate to adjust the position of the counterweight and to clamp it securely in adjusted position.

Another feature of advantage is that an indicator is provided visible from the front face of the face plate to indicate the position of the counterweight.

Heretofore counterweights for lathes have been in the form of weights movable radially or circumferentially upon the face plate. It is a primary object therefore to improve the form of counterweights by making it in one integral mass adjustable diametrically upon the face plate.

With these and other objects in view, my invention consists in the features of construction and operation set forth in the following specification and illustrated in the accompanying drawings.

In the accompanying drawings annexed hereto and forming a part of this specification, I have shown my invention embodied on the face plate of a journal turning lathe, but it will be understood that the invention can be otherwise embodied and that the drawings are not to be construed as defining or limiting the scope of the invention, the claims appended to the specification being relied upon for that purpose.

In the drawings:

Fig. 2 is a corresponding view of the counterweight taken from the opposite side or rear face of the face plate.

Fig. 3 is a sectional view of the face plate and counterweight taken upon the line 3—3 of Fig. 1, and Fig. 4 is a sectional view of a detail of the invention taken upon line 4—4 of Fig. 1.

Figure 1:
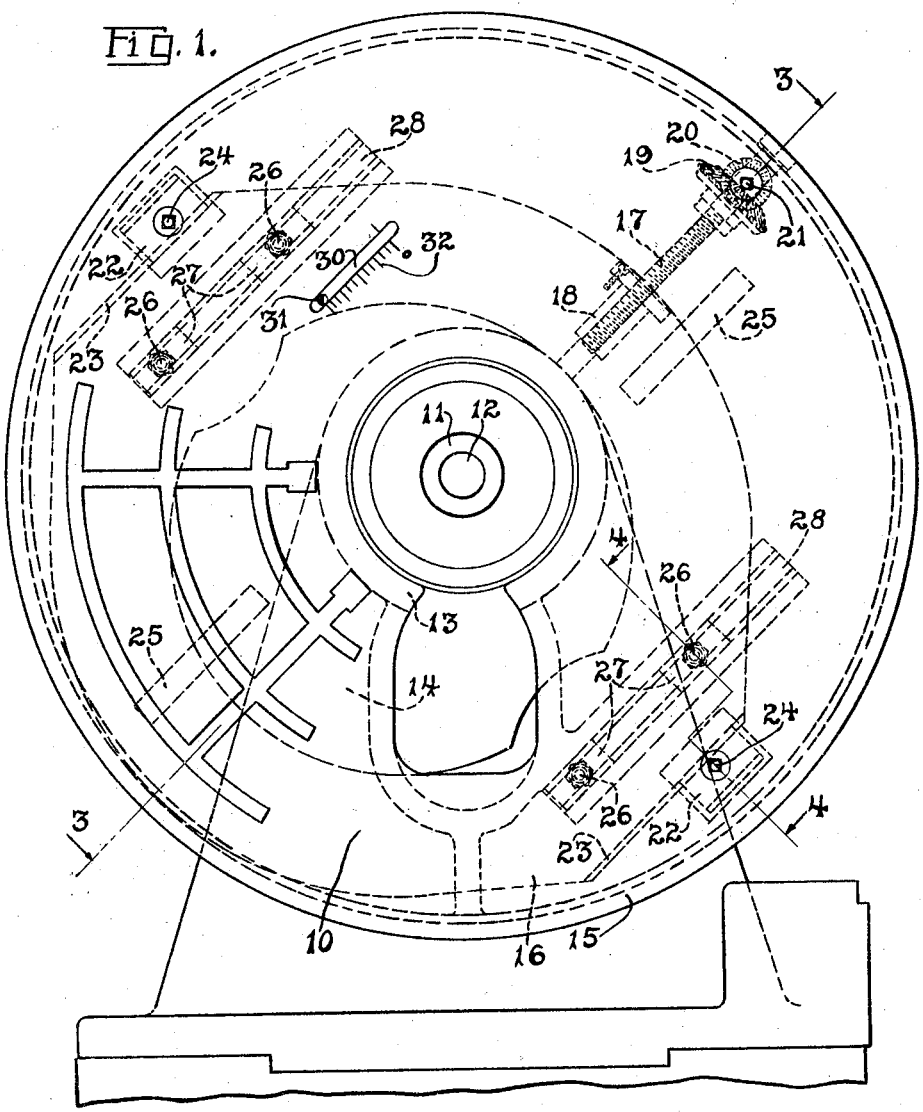
Figure 1 is a front view of the face plate provided with a counterweight forming the present invention.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a face plate of a form adapted for use on lathes; second, a counterweight of annular or ring form surrounding the hub portion of the face plate and adapted to be adjustably clamped in a concentric or an eccentric position upon the face plate; third, adjusting means operable from the front face of the face plate to vary the position of the counterweight; and fourth, an indicator adapted to determine the position of the counterweight relative to the axis of rotation of the face plate.

Referring more in detail to the figures of the drawing, I show a face plate 10 of conventional form mounted upon the headstock spindle 11 of a lathe of large size having the usual work supporting center 12 therein. As the invention does not relate to the method of rotating or securing the face plate 10 to the spindle 11, these parts are not shown or described. As will be seen from an inspection of Fig. 3, the face plate 10 comprises a hub portion 13, a web portion 14 and an outer flange portion 15. Within the recess formed between the hub 13 and the flange 15 is adapted to be clamped a single large and heavy counterweight 16 of annular form. The form preferred for this weight 16 is indicated clearly in Fig. 2, the opening within the center of the weight 16 being sufficient for the weight 16 to completely surround the hub 13 of the face plate in its extreme positions of adjustment.

To adjust the position of this weight 16 a screw 17 is provided rotatably mounted as shown in Fig. 2 on the rear face of the web portion 14. This screw 17 engages a nut 18 secured within a part of the counterweight 16. By means of intermeshing bevel gears 19 and 20 the screw 17 may be rotated and the weight 16 adjusted to different diametrical positions. For convenience the shaft 21 carrying one of the bevel gears 20 extends to the front face of the face plate 10 so that by means of a wrench placed upon the squared head of this shaft 21 the position of the weight 16 may be quickly changed. To clamp the weight 16 securely in position upon the face plate 10, clamping strips 22 are positioned on the rear surface of the web portion 14 adapted to engage a surface of a recess 23 formed in an outer portion of the weight 16. By means of a screw 24 passing through these clamping strips 22 and having its head extending to the front face of the face plate 10, the counterweight 16 may be quickly clamped or unclamped in any adjusted position. Preferably and as shown in Fig. 2, clamping strips are placed on opposite sides of the weight 16.

For convenience the weight 16 is adapted to slide upon bearing strips 25 provided integrally on the rear face of the web portion 14 of the face plate 10 and adapted to be held in sliding contact thereto by means of bolts 26 extending through the weight 16 and having nut portions 27 entering T-slots in opposed guideways 28. If desired, several of these screws or bolts 26 and nuts 27 may be provided for each of the guideways 28 so that the weight 16 will be at all times held toward the web 14 of the face plate 10.

Extending through a slot 30 within the web portion 14 of the face plate 10 is a pin 31 outstanding from one side face of the weight 16 so that the position of the weight 16 can be determined by the operator from positions in front of the face plate 10. Preferably graduations 32 are provided on one side of this slot 30 calibrated to indicate the amount of counterbalancing effect of the weight 16 when in the different adjusted positions indicated by the graduations.

From the above described construction it will be seen that the weight 16 may be adjusted to various positions upon the face plate 10. The position shown in the drawings is the position of the weight wherein it has maximum counterbalancing effect. From the position shown, the weight 16 may be moved from its eccentric position to one concentric to the axis of rotation of the spindle 11. As the weight 16 is of symmetrical form, the counterbalancing effect in this concentric position is entirely neutralized.

What I claim is:

1. Counterbalancing means for lathes comprising in combination, a face plate, a single counterweight surrounding the axis of rotation of said face plate, and unitary means permitting adjustment of said counterweight to vary its position from neutral to a position having maximum counterbalancing effect.

2. Counterbalancing means for lathes comprising in combination, a face plate, an annular counterweight surrounding the axis of rotation of said face plate, and unitary means permitting transverse adjustment of said counterweight diametrically of said face plate to vary its position from neutral to a position having maximum counterbalancing effect.

3. Counterbalancing means for lathes comprising in combination, a face plate, a single counterweight mounted on said face plate, and unitary means permitting diametrical adjustment of said counterweight relative to said face plate from a concentric balanced position to eccentric positions thereon to vary its counterbalancing effect.

4. Counterbalancing means for lathes comprising in combination, a face plate, a counterweight of symmetrical form surrounding the axis of rotation of said face plate and housed within said face plate, and means to adjust said counterweight diametrically upon said face plate from a neutral position to a position having maximum counterbalancing effect.

5. Counterbalancing means for lathes comprising in combination, a face plate, an annular counterweight of symmetrical form surrounding the axis of rotation of said face plate and housed within said face plate, and means to adjust said counterweight diametrically upon said face plate from a neutral position to an eccentric position having maximum counterbalancing effect.

6. Counterbalancing means for lathes comprising in combination, a face plate, a weight of ring form adjustably secured to the rear face of said face plate, supporting and guiding means for said weight, and unitary means for adjusting and clamping said weight in different positions whereby said weight may be secured in neutral or counterbalancing positions.

7. Counterbalancing means for lathes comprising in combination, a face plate, a weight of ring form adjustably secured to the rear face of said face plate, supporting and guiding means for said weight, means for adjusting and clamping said weight in different positions whereby said weight may be secured in neutral or counterbalancing positions, and means to indicate the adjustment of said weight.

8. Counterbalancing means for lathes comprising in combination, a face plate, a weight of ring form adjustably secured to the rear face of said face plate, supporting and guiding means for said weight, and means for adjusting and clamping said weight in adjusted position whereby said weight may be secured in neutral or counterbalancing positions, said adjusting and clamping means being operable from the front face of said face plate.

In testimony whereof, I hereto affix my signature.

LYNDON C. COLE.